US006986486B2

(12) United States Patent
Darbyshire

(10) Patent No.: US 6,986,486 B2
(45) Date of Patent: Jan. 17, 2006

(54) AIRCRAFT CONTROL SYSTEM

(75) Inventor: Ian Thomas Darbyshire, St. Annes, Lancs. (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 10/240,190

(22) PCT Filed: Mar. 8, 2001

(86) PCT No.: PCT/GB01/01003

§ 371 (c)(1),
(2), (4) Date: Jan. 15, 2003

(87) PCT Pub. No.: WO01/73516

PCT Pub. Date: Oct. 4, 2001

(65) Prior Publication Data

US 2003/0141418 A1 Jul. 31, 2003

(30) Foreign Application Priority Data

Mar. 29, 2000 (GB) .............................. 0007619

(51) Int. Cl.
B64C 13/16 (2006.01)

(52) U.S. Cl. ...................... 244/195; 244/75 R; 701/3; 701/9; 701/10

(58) Field of Classification Search ............... 244/76 R, 244/76 C, 191, 194, 195; 701/3, 8, 9, 10
See application file for complete search history.

(56) References Cited

U.S. PATENT DOCUMENTS

| 2,985,409 | A | * | 5/1961 | Atwood et al. ............. 244/191 |
| 3,074,385 | A | | 1/1963 | Nass |
| 3,734,432 | A | * | 5/1973 | Low ........................... 244/191 |
| 4,906,990 | A | | 3/1990 | Robinson |
| 5,102,072 | A | * | 4/1992 | Egan et al. .................. 244/195 |
| 5,186,416 | A | * | 2/1993 | Fabre et al. ............... 244/75 R |
| 5,819,188 | A | * | 10/1998 | Vos ............................... 701/4 |
| 6,622,972 | B2 | * | 9/2003 | Urnes et al. ................. 244/194 |

FOREIGN PATENT DOCUMENTS

| AU | 55077/90 | 1/1991 |
| DE | 42 40 600 | 6/1994 |
| EP | 0 067 548 | 12/1982 |
| GB | 2 234 353 A | 1/1991 |
| GB | 2 267 470 A | 12/1993 |
| JP | 9249199 | 9/1997 |

OTHER PUBLICATIONS

Patent Abstracts of Japan, vol. 014, No. 147, Mar. 20, 1990, & JP 02 011496 A, Jan. 16, 1990, Abstract.

* cited by examiner

*Primary Examiner*—Galen Barefoot
(74) *Attorney, Agent, or Firm*—Nixon & Vanderhye P.C.

(57) ABSTRACT

This invention control system having: means (12) for detecting an irregularity in aircraft handling during flight; means (18) for causing temporarily a rigid body excitation in at least a portion of the aircraft; means (20) for monitoring an actual response to the excitation; means (22) for comparing the actual response and a target response to the rigid body excitation; and means (14) responsive to an output from the comparison means for determining the need for a modification of the current flight plan and for generating a corresponding control output. The invention also provides a corresponding method for controlling an aircraft.

17 Claims, 2 Drawing Sheets

AIRCRAFT CONTROL SYSTEM

This application is the U.S. national phase of international application PCT/GB01/01003, filed in English on 8 Mar. 2001 which designated the U.S. PCT/GB01/01003 claims priority to GB Application No. 0007619.0 filed 29 Mar. 2000. The entire contents of these applications are incorporated herein by reference.

The present invention concerns an aircraft control system, primarily for an unmanned aircraft for enhancing or otherwise improving the airworthiness of the aircraft.

Unmanned aircraft, even when remotely piloted, may still encounter situations when they have to operate with a degree of autonomy and in the absence of communication between the aircraft and ground. Such a situation may arise, for example, in the event of the communication difficulties between the aircraft and the control station or on occasions when flight stealth is required.

Flight accuracy and safety during times when an unmanned aircraft is not in communication with a ground control station is a high requirement, but one which has not yet been satisfactorily resolved.

In a manned aircraft, the pilot receives positive indications of the aircraft's status from the sensor, safety and control systems of the aircraft and from the various systems failure warnings, and he uses these signals for responding to the current flight circumstances. In addition, the pilot also has an "intuitive sense" as to when his aircraft is behaving in an unusual or potentially dangerous manner. These additional flying skills are not available to the ground based remote operator of an unmanned aircraft, especially in circumstances when the unmanned aircraft is out of communication with the operator. This may be reflected in the responses of the unmanned aircraft to unexpected flight conditions, and hence in the accuracy and safety of the aircraft flight.

It is an aim of the present invention to improve the ability of an unmanned aircraft to detect, locate the cause of and take corrective action for unexpected or unusual circumstances arising during flight.

According to the present invention, an aircraft control system comprises:

means for detecting an irregularity in aircraft handling during flight;

means responsive to an output from the detecting means for causing a rigid body excitation in at least a portion of the aircraft;

means for monitoring an actual response of the aircraft to the rigid body excitation;

means for effecting a comparison of the actual response with a target response of the aircraft to the rigid body excitation; and means responsive to an output from the comparison means for determining the need for a modification of the current flight plan for dealing with the irregularity and for generating a corresponding control output.

The comparison means may include means for generating a flight condition analysis, and the determining means may be arranged to evaluate the current flight plan on the basis of such flight condition analysis in order to generate a control output in the form of a flight control signal for effecting corrective action if necessary.

In a preferred embodiment of the invention, the means for causing a rigid body excitation in at least a portion of the aircraft are arranged temporarily to apply a low level periodic exciting force to a rigid frame portion of the aircraft. In this instance, the monitoring means may be arranged to detect a transient response of the rigid frame portion of the aircraft to such excitation. The actual response of and the target response for the rigid frame portion may then be compared in terms of frequency/transient characteristics.

For example, the excitation may be applied to a rigid frame portion of the aircraft by briefly imposing a low amplitude periodic motion on top of the normal movement of the flight control surfaces of the aircraft. This periodic motion may conveniently be sinusoidal.

In a preferred form of the invention, means are provided for calculating the target response to the rigid body excitation, in which case the calculation means may employ a complex mathematical model for calculating the target response. For example, the aircraft may have a stored computer model of expected responses based on the Euler Dynamic Equations of Motion and established during the aircraft design process.

More particularly, the mathematical model may be based on an analysis during design of the combined control laws and aircraft dynamic characteristics, including anticipated frequency, transient and damping responses for the specific design criteria of the aircraft.

In a preferred form of the invention, the means for monitoring the actual aircraft response includes means for measuring inertial aircraft body rates, accelerations, and control surface positions.

According to another aspect of the present invention, there is provided a method of aircraft control comprising:

detecting an irregularity in aircraft handling during flight;

causing a rigid body excitation in at least a portion of the aircraft in response to such detection;

monitoring an actual response of the aircraft to the rigid body excitation;

comparing the actual response with a target response of the aircraft to the rigid body excitation; and determining the need for a modification of the current flight plan in response to such comparison and generating a corresponding control output.

The invention is described further, by way of example, with reference to the accompanying drawings in which.

Figure 1:
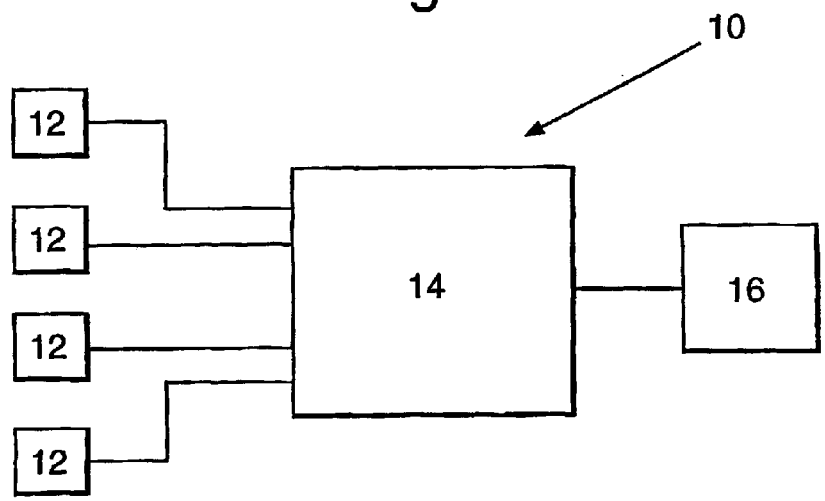
FIG. 1 is a block diagram of a conventional flight control system for use in an unmanned aircraft.

Referring initially to FIG. 1, an unmanned aircraft conventionally has a flight control system 10 including a plurality of sensors 12 for detecting current flight conditions, such as aircraft velocity, aircraft acceleration, aircraft attitude, air data, control surface positions, steering commands etc. The sensors 12 provide output signals to an onboard computer 14 for monitoring the flight situation in relation to a predetermined flight plan. The flight computer 14 then provides an output to control means 16 for adjusting the aircraft flight as required.

The flight computer 14 may also be arranged to receive signals from a remote operator at a ground control station if desired.

The control system shown in FIG. 1 operates by way of a feed-back arrangement in which the aircraft flight is monitored by the sensors 12 and the flight computer 14 and then appropriate adjustments are made in the aircraft controls and control surfaces to maintain the desired course and speed.

Figure 2:
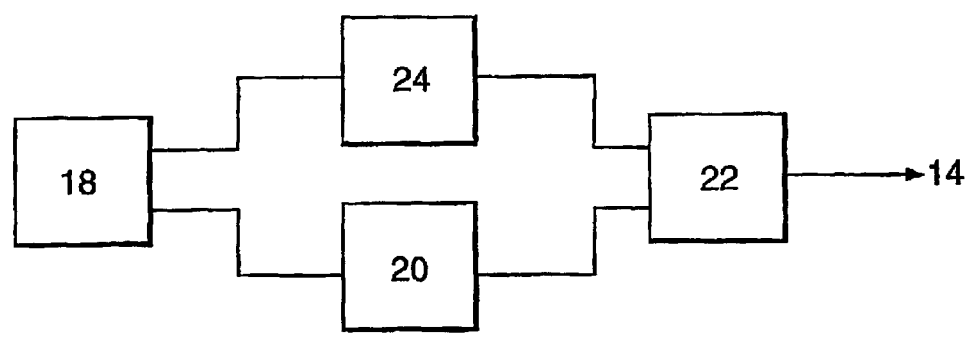
FIG. 2 is a block diagram of a modification of the flight control system of FIG. 1 according to the present invention.

Turning now to FIG. 2, the present invention envisages supplementing the control system as shown in FIG. 1 with additional features. According to the invention, the aircraft also includes excitation means 18 for subjecting at least a portion of the aircraft frame temporarily to a rigid body excitation in response to an indication from the sensors 12 and flight computer 14 that there is an anomaly in aircraft handling during flight. In the present instance, it is envisaged that the excitation means 18 will respond to such indication by briefly applying a low level periodic exciting force to cause a low amplitude sinusoidal motion in the flight control surfaces through the normal flight control actuators. The low amplitude of such motion will have the advantage of keeping any resulting flight path deviations to a minimum.

Detection means 20 are arranged to monitor the actual response of the aircraft or portion thereof to the temporary excitation, for example by determining the frequency/transient characteristics of one or more selected regions of the aircraft body to the excitation. The detection means 20 may also employ data based on measured inertial aircraft body rates, aircraft accelerations and measured control surface positions for monitoring the response of the aircraft to the excitation. The detection means 20 are arranged to generate a detection output for supply to comparison means 22.

In addition, means 24 are connected to the excitation means 18 for computing a target response to the temporary rigid body excitation. The computing means 24 may employ a complex mathematical model for calculating the target response and in the present instance includes a stored computer model of expected responses based on the Euler Dynamic Equations of Motion. Such a computer model is established during the aircraft design process and is stored in the computing means 24 at this time. Alternatively, if the target response does not vary with flight conditions, e.g. atmospheric pressure, then the computing means 24 may merely be a memory, such as a look up table, storing the target response.

The computing means 24 are arranged to produce an output representing the target response for supply to the comparison means 22.

The comparison means 22 receives the outputs from the detection means 20 and the calculation/storage means 24 and performs a comparison of the actual aircraft response with the target aircraft response. The comparison means 22 are arranged to generate a flight condition analysis representing the difference between the actual aircraft response and the target response for supply to the flight computer 14.

According to the present invention, the flight computer 14 evaluates the flight condition analysis in relation to the current flight plan and includes the outcome of such evaluation in its decision making process for prompting a decision to modify and/or alter the existing flight plan if necessary. Such a decision might include a modification in the form of a corrective action or adjustment within the control system, for example a reversion to a lower level of system multiplexing, or a change in control loop gains. Alternatively, such a decision might include an alteration to aircraft mission, for example an instruction to land as soon as possible, or to fly to a pre-defined safe place and ditch.

Figure 3:
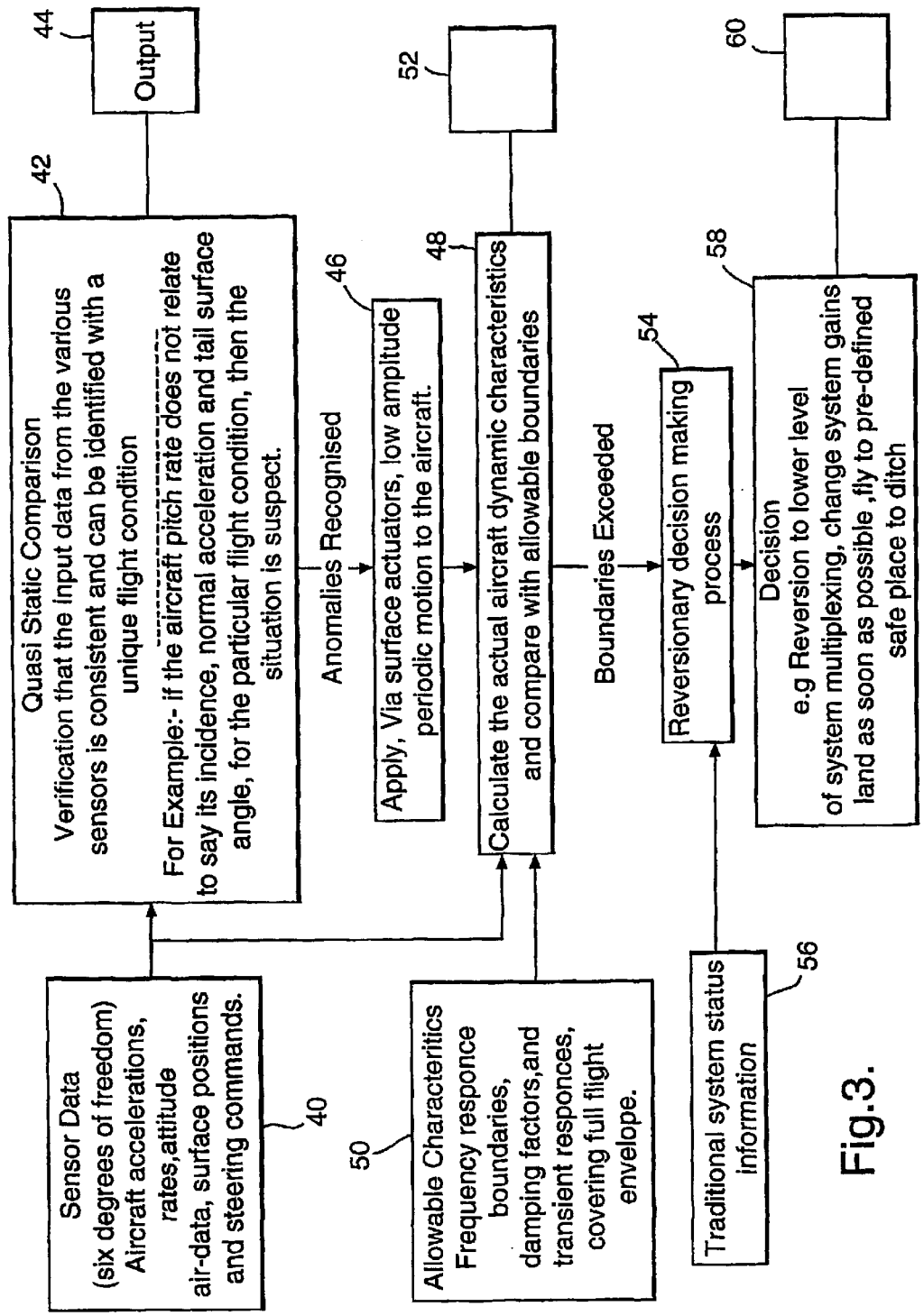
FIG. 3 is a flow diagram representing operation of an aircraft computer of the flight control system according to the present invention.

Turning to FIG. 3, this shows a flow diagram representing the operation of the flight computer 14 according to the present invention. This operation will now be described.

In step 40, the computer 14 receives data from the sensors 12 in the normal way, representing aircraft velocity, aircraft acceleration, aircraft attitude, air data, control surface positions and steering commands, for example. The computer 14 evaluates such data in step 42 to verify that the data is consistent and that it can be identified with a unique flight condition according to a pre-determined flight plan. In the event that such verification is satisfactory, the computer proceeds to step 44 in the normal way and generates a flight control output for supply to the control means 16 for adjusting the aircraft flight in accordance with the flight plan as required.

On the other hand, in the event that the verification of step 42 indicates an anomaly or irregularity in the handling of the aircraft, then and only then the computer proceeds to step 46. By way of example, if the sensor data supplied in step 40 represents an aircraft pitch rate that does not relate to the incidence, the normal acceleration and the tail surface angle for the particular flight condition, then the verification made in step 42 will determine that an anomaly or irregularity is present, and the computer will proceed to step 46.

In step 46, the computer will generate an output to the excitation means 18 to cause a temporary exciting force to be applied to a rigid body portion of the aircraft, for example to cause a low amplitude periodic or sinusoidal motion in the control surfaces of the aircraft via the control surface actuators.

Following this, in step 48, the computer will now receive and monitor the sensor data obtained from the sensors 12 in step 40 and will calculate the actual response of the aircraft to the rigid body excitation.

In step 50, the computer will simultaneously calculate a set of allowable characteristics for factors such as frequency response boundaries, damping factors, and transient responses covering the full flight envelope and representing an anticipated or target response to the rigid body excitation. Data representing the target response is then compared in step 48 with data representing the actual aircraft response and an output in the form of a flight condition analysis is generated.

If the comparison of the data for the actual and target responses yields a satisfactory result, in that the actual aircraft response falls within the allowable characteristics calculated in step 50, then the computer proceeds to step 52 indicating that no action is required. On the other hand, if the comparison effected in step 48 indicates that the actual aircraft response does not fall within the allowable characteristics calculated in step 50 and that certain limits or boundaries have been exceeded, the computer proceeds to step 54.

In step 54, the computer receives data representing flight control system status based on the pre-determined flight plan, such data being generated in step 56. The flight condition computer evaluates such data analysis together with data generated in step 48 including data represented the limits or boundaries that have been exceeded, and determines what modifications and/or alterations to the existing flight plan are necessary for dealing with the irregularity or anomaly. The computer issues a decision in step 58, which may be a decision to effect adjustments in the existing flight control program, for example to revert to a lower level of system multiplexing or to change system control loop gains, or which may be a decision to alter the aircraft mission and to land as soon as possible or to fly to a predefined safe place to ditch the aircraft.

In step 60, the computer generates an output based on the decision taken in step 58 for supply to the control means 16 for implementing the decision.

In this way, an anomaly in flight handling may be picked up and corrected before the primary attitude sensors of the aircraft have even begun to provide "out-of-desired-flightenvelope" responses. Unexpected or dangerous situations can thus be corrected before they develop into unplanned flight maneuvers.

The present invention provides a radical approach to flight control in that it envisages a proactive arrangement based on excitation of the aircraft rather than a reactive system simply based on monitoring sensor data.

What is claimed is:

1. An aircraft control system having:
   means for detecting an irregularity in aircraft handling during flight;
   means, responsive to an output from the detecting means, for causing a temporary application of a rigid body excitation in at least a portion of the aircraft;
   means for monitoring an actual response to the rigid body excitation;
   means for effecting a comparison of the actual response with a target response of the aircraft to the rigid body excitation; and
   means responsive to an output from the comparison means for determining the need for a modification of the current flight plan for dealing with the irregularity and for generating a corresponding control output.

2. A system according to claim 1 which includes means for calculating a target response to the excitation.

3. A system according to claim 2 in which the calculating means comprise a stored mathematical model.

4. A system according to claim 3 in which the mathematical model is based on Euler Dynamic Equations of Motion.

5. A system according to claim 3 in which the mathematical model is based on an analysis of aircraft control laws and dynamic characteristics undertaken during design.

6. A system according to claim 1, in which the means for causing excitation comprise means for temporarily applying a low level periodic force to a rigid portion of the aircraft frame.

7. A system according to claim 1, in which the monitoring means is arranged to detect a frequency/transient characteristic of at least a portion of the aircraft.

8. A system according to claim 1, in which the monitoring means is arranged to detect at least one of the following: inertial aircraft body rates, aircraft accelerations, and control surface positions.

9. A system according to claim 1, in which the comparison means is arranged to generate a flight condition analysis as an output.

10. A system according to claim 1, in which the control output represents one of a flight control adjustment signal and a flight plan alteration signal.

11. A method of controlling an aircraft comprising:
    detecting an irregularity in aircraft handling during flight;
    causing a temporary application of a rigid body excitation in at least a portion of the aircraft in response to such detection;
    monitoring the actual response of at least a portion of the aircraft to the rigid body excitation;
    comparing the actual response with a target response of the aircraft to the rigid body excitation;
    determining the need for a modification of the current flight plan for dealing with the irregularity, and
    generating a corresponding control output.

12. A method according to claim 11 in which the rigid body excitation comprises a low level periodic force temporarily applied to a rigid portion of the aircraft frame.

13. A method according to claims 11 in which the step of monitoring comprises detecting frequency/transient characteristics of at least a portion of the aircraft.

14. A method according to claim 11, which includes calculating a target response to the rigid body excitation.

15. A method according to claim 14 in which the step of calculating comprises employing a stored mathematical model of anticipated responses.

16. A method according to claim 11, in which the step of comparing includes generating a flight condition analysis.

17. A method according to claim 11, including the step of adjusting one of the flight control and altering the flight plan in response to the control output.

* * * * *